Aug. 4, 1942. A. MANDL Re. 22,154

EXCITATION SYSTEM FOR DYNAMOELETRIC MACHINES

Original Filed Jan. 25, 1937

Inventor:
Arthur Mandl,
by Harry E. Dunham
His Attorney.

Reissued Aug. 4, 1942

Re. 22,154

UNITED STATES PATENT OFFICE 22,154

EXCITATION SYSTEM FOR DYNAMOELECTRIC MACHINES

Arthur Mandl, Sheffield, England, assignor to General Electric Company, a corporation of New York Original No. 2,165,976, dated July 11, 1939, Serial No. 122,243, January 25, 1937. In Germany February 17, 1936. Application for reissue June 18, 1941, Serial No. 398,682

12 Claims. (Cl. 171—119)

Figure 1:
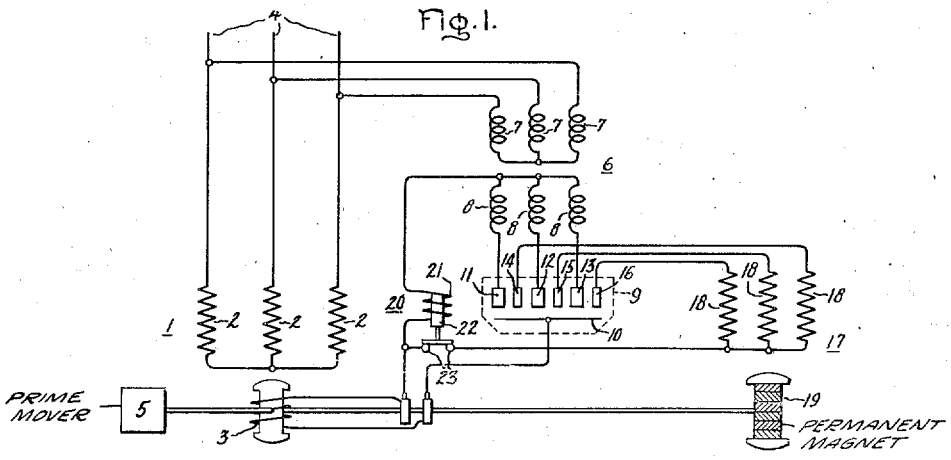

My invention relates to excitation systems for dynamo-electric machines and more particularly to self-excitation circuits for dynamo-electric machines of the synchronous type.

Because of the high efficiency and the facility of operation of electronic discharge apparatus of the type employing ionizable medium such as gases or vapors, there has been a tendency to employ these devices in excitation circuits for dynamo-electric machines of large ratings. Since there are particular advantages to be derived by the use of electronic discharge apparatus in installations of this nature, it becomes increasingly important to employ apparatus of high efficiency and of reasonable proportion relative to the main or principal apparatus. In order to eliminate the necessity for elaborate installations of auxiliary apparatus and control apparatus in connection with the operation of electric generators of large rating such as turbo-alternators and waterwheel driven generators, there has been evidenced a decided need for excitation systems capable of energizing the field winding of the machines independently of any auxiliary source of current. For example, in the case of isolated hydro-electric plants where elaborate and complicated auxiliary or control equipment would necessitate frequent inspections and disproportionate initial investment, it is highly important and desirable to provide electric valve apparatus which is simple in constructon and operation for supplying the excitation of the main generators during the starting operation independently of any auxiliary source of energy. Due to the fact that the main generators are not designed to maintain a substantial residual magnetism and due to the fact that the operating conditions immediately preceding the starting operation may have been such that the residual magnetism of the machine has been reduced to a substantially zero value, it is important to provide some auxiliary equipment whereby the excitation of the main generator is built up to a sufficient value to permit electric valve apparatus to be energized from the armature winding of the main generator.

It is an object of my invention to provide a new and improved excitation system for dynamo-electric machines.

It is another object of my invention to provide a new and improved self-excitation system for a dynamo-electric machine of the synchronous type.

It is a further object of my invention to provide a new and improved self-excitation system for starting dynamo-electric machines.

In accordance with the illustrated embodiments of my invention, I provide a new and improved electric valve system for energizing the field winding of a dynamo-electric machine independently of any auxiliary source of current. The electric valve means comprises a plurality of main or principal arc discharge paths which are connected to be energized from the armature windings of the dynamo-electric machine and also comprises a plurality of auxiliary arc discharge paths for establishing or building up the excitation of the machine to a value sufficient for initiating arc discharges within the principal arc discharge paths. An auxiliary alternating current generator having a permanent magnet field member or being of a material of high coercive force is employed to energize the auxiliary arc discharge paths to effect energization of the field winding of the main generator during the starting operation. Means responsive to an electrical condition of the field winding, such as the current of the field winding, is provided to disconnect the auxiliary generator after arc discharges have been established within the principal arc discharge paths.

For a better understanding of my invention reference may be had to the following description taken in connection with the accompanying drawing and its scope will be pointed out in the appended claims.

Figure 2:
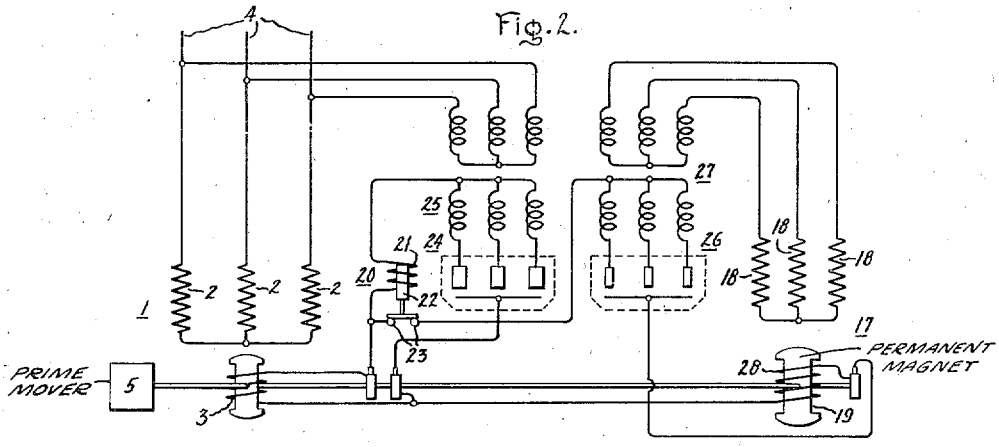
Figure 3:
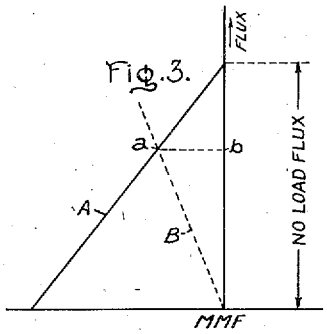

Figs. 1 and 2 represent certain embodiments of my invention as applied to a system for energizing the field winding of a dynamo-electric machine, and Fig. 3 represents certain operating characteristics of the embodiment of my invention shown in Fig. 2.

Referring now to Fig. 1, my invention is diagrammatically illustrated therein as applied to a self-excitation system for a dynamo-electric machine 1 of the synchronous type having armature windings 2 and a relatively movable field winding 3. The armature windings 2 are connected to an alternating current circuit 4 which may form a part of a transmission or distribution system. The field winding 3 may be driven by any suitable means such as a prime mover 5 which is diagrammatically illustrated in the drawing.

I provide an excitation system for energizing the field winding 3 from the armature windings 2 comprising a transformer 6 having primary windings 7 and secondary windings 8, and an electronic discharge device 9 comprising a plurality of arc discharge paths. The electronic discharge device 9 comprises a cathode 10, a plurality of principal anodes 11, 12 and 13 and a plurality of auxiliary anodes 14, 15 and 16. While for the purpose of explaining my invention I have chosen to represent the electronic discharge means 9 as being of the type including a plurality of anodes and a single cathode mounted within a single enclosing receptacle, it should be understood that I may employ a plurality of electronic discharge devices of the type in which a single anode and cathode are mounted within the receptacle. In order to energize the field winding 3 of the dynamo-electric machine 1 during the starting operation before the excitation of the machine 1 has increased to a value sufficient for establishing arc discharges between the principal anodes 11, 12 and 13 and the cathode 10, I provide an auxiliary alternating current generator 17 including armature windings 18 and a field member 19. The field member 19 may be a permanent magnet or may be of material of relatively great coercive force so that upon rotation of the field winding 3 and the field member 19 by the prime mover 5 during the starting operation, there will be a sufficient voltage induced in the armature windings 18 of auxiliary generator 17 to establish arc discharges between the auxiliary anodes 14, 15 and 16 and the cathode 10 to build up the excitation of the machine 1.

As a means for disconnecting the auxiliary generator 17 from the circuit for the field winding 3 after electric discharges have been initiated between the principal anodes 11, 12 and 13 and the cathode 10, I provide any suitable means responsive to a predetermined operating condition of the machine 1 such as an electrical condition of the field circuit. In the particular arrangement shown in Fig. 1 this means is diagrammatically shown as including a current responsive device 20 connected in the field circuit and includes an actuating winding 21 connected in series relation with the field winding 3 and secondary windings 8 of the transformer 6. The current responsive device 20 includes an armature member 22 and contacts 23. While for the purpose of illustrating my invention I have chosen to represent this means for disconnecting the auxiliary generator 17 in accordance with the current of the field winding 3 of machine 1, it should be understood that I may employ any suitable means responsive to other suitable conditions of the dynamo-electric machine 1 for effecting this operation.

The operation of the embodiment of my invention diagrammatically shown in Fig. 1 may be best explained by considering the excitation system during a starting operation. Prior to the initiation of the rotation of the armature member 21 the current responsive device 20 will be in the position shown to engage the contacts 23 so that the armature windings 18 of the auxiliary alternating current generator 17 are connected to the field winding 3 of dynamo-electric machine 1 through the auxiliary anodes 14, 15 and 16 of electronic discharge device 9. Upon rotation of the field member 19 of the auxiliary generator 17 there will be induced in the armature windings 18 a voltage of sufficient magnitude to initiate arc discharges between the cathode 10 and the auxiliary anodes 14, 15 and 16 of the electronic discharge means 9 to supply direct current to the field winding 3 of machine 1 to build up the excitation of this machine. When the voltage of the machine 1 builds up to a value sufficient to initiate arc discharges between the cathode 10 and the principal anodes 11, 12 and 13 there will be supplied to the field winding 3 a current of increased value established by the design of the transformer 6 and the design of machine 1. After the current supplied to the field winding 3 by the principal anodes 11, 12 and 13 increases to a predetermined value established by the design or adjustment of the current responsive means 20, armature member 22 thereof will be raised to open the contacts 23 disconnecting the auxiliary generator 17 from the field winding 3.

An important feature of my invention is the fact that after the build up of excitation of the machine 1 is initiated by the auxiliary generator 17, the generator 17 is disconnected from the energizing circuit for the field winding 3. Since the auxiliary generator 17 is not subjected to short circuit conditions of the machine 1 which would tend to reduce the residual magnetism of the field member 19, there is always available an auxiliary source of voltage for initiating the energization of the field winding 3 during a starting operation.

Fig. 2 shows another embodiment of my invention substantially similar to that shown in Fig. 1 and corresponding elements have been assigned like reference numerals. The field winding 3 of dynamo-electric machine 1 is energized through a principal electronic discharge device 24 and an associated transformer 25. The energization of the field winding 3 during the starting operation is provided by means of the auxiliary alternating current generator 17 and an associated auxiliary electronic discharge device 26 and an associated transformer 27. In order to increase the excitation of the auxiliary generator 17 to compensate for armature reaction as the auxiliary generator 17 begins to supply current to the field winding 3 during the starting operation, I provide a field winding 28 which is connected in series relation with the field winding 3 and electronic discharge device 26. By virtue of this arrangement there is provided a means for maintaining the excitation of the auxiliary generator 17 at a proper value so that the armature current does not materially decrease the voltage of the auxiliary generator 17 during the starting operation.

The operation of the arrangement of my invention diagrammatically shown in Fig. 2 is substantially the same as that explained above in connection with Fig. 1. The operating characteristics shown in Fig. 3 may be considered relative to the operation of the auxiliary alternating current generator 17 and the function which the winding 28 performs in maintaining the excitation of this generator at a predetermined value. Curve A represents the flux of the auxiliary generator 17 as a function of the magnetomotive force, and line B represents the demagnetizing action of the armature current flowing in windings 18 of machine 17. The intersection of these two curves at point *a* represents the resultant flux in the generator 17 and the distance *a*—*b* represents the magnetomotive force required to compensate for the armature demagnetization.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine having an armature winding and a relatively movable field winding, electronic discharge means for energizing said field winding comprising a plurality of principal arc discharge paths connected to be energized from said armature winding and a plurality of auxiliary arc discharge paths, an auxiliary alternating current generator having a permanent magnet field member for energizing said auxiliary arc discharge paths to energize said field winding in order to increase the excitation of said dynamo-electric machine to a value sufficient to initiate electric discharges within said principal arc discharge paths, and means responsive to a predetermined electrical condition of said machine for effecting energization of said field winding from said principal arc discharge paths when the excitation of said machine attains a predetermined value.

2. In an excitation system for a dynamo-electric machine having an armature winding and a relatively movable field winding, the combination of an electronic discharge means energized from said armature winding for supplying direct current to said field winding, an auxiliary alternating current generator having a permanent magnet field member, an auxiliary electronic discharge means interposed between said field winding and said auxiliary alternating current generator for supplying direct current to said field winding in order to increase the excitation of said dynamo-electric machine to a value sufficient to initiate electric discharges within said first mentioned electronic discharge means, and means responsive to the voltage of said armature winding for effecting energization of said field winding from said first mentioned electronic discharge means when the armature voltage attains a predetermined value.

3. In combination, a dynamo-electric machine having an armature winding and a field winding, means for rotating said field winding relative to said armature winding, electronic discharge means energized from said armature winding for energizing said field winding, means for building up the excitation of said dynamo-electric machine comprising an auxiliary alternating current generator having a field member of high coercive force and an auxiliary electronic discharge means interposed between said field winding and said auxiliary alternating current generator for supplying direct current to said field winding prior to the initiation of an arc discharge within said first mentioned electronic discharge means, and means responsive to the voltage of said armature winding for connecting said first mentioned electronic discharge means to said field winding when the armature voltage of said machine attains a predetermined value.

4. In combination, a dynamo-electric machine having an armature winding and a field winding, means for rotating said field winding relative to said armature winding, electronic discharge means energized from said armature winding for energizing said field winding, means for energizing said field winding during a starting operation comprising an auxiliary alternating current generator having a permanent magnet field member and an auxiliary electronic discharge means interposed between said field winding and said auxiliary alternating current generator for energizing said field winding during said starting operation, and means responsive to an operating condition of said dynamo-electric machine for disconencting said auxiliary generator from said field winding.

5. In combination, a dynamo-electric machine having an armature winding and a field winding, means for rotating said field winding relative to said armature winding, electronic discharge means energized from said armature winding for supplying direct current to said field winding, an auxiliary alternating current generator driven by said first mentioned means and including a field member having a high coercive force and a field winding associated with said field member, an auxiliary electronic discharge means interposed between said first mentioned field winding and said auxiliary generator for supplying direct current to said first mentioned field winding during a starting operation, said field winding of said auxiliary generator being proportioned to assure a positive build-up of the excitation of said auxiliary generator to establish electric discharges within said auxiliary electronic discharge means during the starting operation, and means responsive to an electrical condition of said first mentioned field winding to disconnect said auxiliary generator and said auxiliary electronic discharge means from said first-mentioned field winding, after the excitation of said dynamo-electric machine has increased to a predetermined value.

6. A system for self-excitation of an alternating current generator having a direct-current field winding comprising means energized from the generator for supplying direct-current excitation to the field winding, and auxiliary means mechanically driven by the generator for supplying excitation to the field winding during the starting period.

7. A system for self-excitation of an alternating current generator having a direct-current field winding comprising means energized from the generator for supplying direct-current excitation to the field winding, and an auxiliary generator driven by the first mentioned generator for supplying excitation to the field winding during the starting period.

8. A system for self-excitation of an alternating current generator having a direct-current field winding comprising means energized from the generator for supplying direct-current excitation to the field winding, an auxiliary synchronous generator driven by the first mentioned generator, and means for converting the output of said auxiliary generator to direct current for exciting said field winding during the starting period while the voltage of the first mentioned generator is building up.

9. A system for self-excitation of an alternating current generator having a direct-current field winding comprising means energized from the generator for supplying direct-current excitation to the field winding, an auxiliary synchronous generator driven by the first mentioned generator, said auxiliary generator having a permanent magnet rotor, and means for converting the output of said auxiliary generator to direct current for exciting said field winding during the starting period while the voltage of the first mentioned generator is building up.

10. A system for self-excitation of an alternating current generator having a direct-current field winding comprising means energized from the generator for supplying direct-current excitation to the field winding, an auxiliary synchronous generator driven by the first mentioned generator, and rectifier means for converting the output of said auxiliary generator to direct current, said rectifier means being connected to said field winding for exciting it during the starting period.

11. A system for self-excitation of an alternating current generator having a direct current field winding comprising means energized from the generator for supplying direct-current excitation to the field winding, an auxiliary synchronous generator driven by the first mentioned generator, rectifier means for converting the output of said auxiliary generator to direct current, said rectifier means being connected to said field winding for exciting it during the starting period, and means for disconnecting the rectifier means from the field winding.

12. A system for self-excitation of an alternating current generator having a direct-current field winding comprising means energized from the generator for supplying direct-current excitation to the field winding, an auxiliary synchronous generator driven by the first mentioned generator, said auxiliary generator having a permanent magnet rotor, rectifier means for converting the output of said auxiliary generator to direct current, said rectifier means being connected to said field winding for exciting it during the starting period, and means for disconnecting the rectifier means from the field winding.

ARTHUR MANDL.